(12) United States Patent
Mordi

(10) Patent No.: US 11,871,824 B2
(45) Date of Patent: Jan. 16, 2024

(54) SYSTEMS AND METHODS FOR A CARRIER BAG

(71) Applicant: Illinois Tool Works Inc., Glenview, IL (US)

(72) Inventor: Lorraine N. Mordi, London (GB)

(73) Assignee: Illinois Tool Works Inc, Glenview, IL (US)

( * ) Notice: Subject to any disclaimer, the term of this patent is extended or adjusted under 35 U.S.C. 154(b) by 813 days.

(21) Appl. No.: 16/965,174

(22) PCT Filed: Feb. 25, 2019

(86) PCT No.: PCT/US2019/019341
§ 371 (c)(1),
(2) Date: Jul. 27, 2020

(87) PCT Pub. No.: WO2019/165341
PCT Pub. Date: Aug. 29, 2019

(65) Prior Publication Data
US 2021/0054674 A1    Feb. 25, 2021

Related U.S. Application Data

(60) Provisional application No. 62/634,948, filed on Feb. 26, 2018.

(51) Int. Cl.
*A45C 13/24* (2006.01)
*A45C 1/00* (2006.01)
(Continued)

(52) U.S. Cl.
CPC ............... *A45C 13/24* (2013.01); *A45C 1/00* (2013.01); *E05G 1/005* (2013.01);
(Continued)

(58) Field of Classification Search
CPC ..... A45C 13/24; A45C 1/00; A45C 2001/003; A45C 2001/006; A45C 2003/002; E05G 1/005; E05G 1/14
See application file for complete search history.

(56) References Cited

U.S. PATENT DOCUMENTS 1,606,258 A * 11/1926 Morssen ................ A45C 13/24
                                                    109/1 R
2,035,498 A *  3/1936 Navis ........................ E05G 1/14
                                                    109/25
(Continued)

FOREIGN PATENT DOCUMENTS

BR    102014026525 A2 *  7/2016
CN      101632969 A       1/2010
(Continued)

OTHER PUBLICATIONS

International Preliminary Report on Patentability for corresponding Application No. PCT/US2019/019341 dated Aug. 27, 2020 (10 pages).

*Primary Examiner* — John K Fristoe, Jr.
*Assistant Examiner* — Justin Caudill
(74) *Attorney, Agent, or Firm* — Joseph M. Butscher; The Small Patent Law Group LLC

(57) ABSTRACT

In an embodiment, a carrier bag is provided. The carrier bag includes an outer mesh configured to have a seal. The outer mesh is configured to have a set of holes along an outer surface are of the outer mesh. The carrier bag includes an inner liner configured to be waterproof. The inner liner is within an interior surface area of the outer mesh. The inner liner is configured to be penetrated by hollow nails of an injection mechanism of a carrier box.

21 Claims, 5 Drawing Sheets

(51) Int. Cl.
  *E05G 1/00* (2006.01)
  *A45C 3/00* (2006.01)
  *E05G 1/14* (2006.01)

(52) U.S. Cl.
  CPC .. *A45C 2001/003* (2013.01); *A45C 2001/006* (2013.01); *A45C 2003/002* (2013.01); *E05G 1/14* (2013.01)

(56) References Cited

U.S. PATENT DOCUMENTS

| | | | | |
|---|---|---|---|---|
| 3,559,593 | A * | 2/1971 | Munton | E05G 1/14 109/42 |
| 5,082,466 | A * | 1/1992 | Rubenstein | D06F 95/006 383/117 |
| 5,156,272 | A * | 10/1992 | Bouchard | E05G 1/14 206/459.1 |
| 9,151,081 | B2 * | 10/2015 | Thomson | E05B 65/5284 |
| 9,469,440 | B1 * | 10/2016 | Flood | A45C 13/008 |
| D816,988 | S * | 5/2018 | McLauchlin | D3/232 |
| 2010/0193582 | A1 * | 8/2010 | Johnson | G07D 11/125 232/1 D |
| 2012/0222973 | A1 * | 9/2012 | Carron | G07F 9/06 206/0.81 |
| 2015/0216275 | A9 * | 8/2015 | Schlipper | A45C 3/001 112/475.08 |
| 2019/0164398 | A1 * | 5/2019 | Perreau | G08B 15/02 |

FOREIGN PATENT DOCUMENTS

| | | | |
|---|---|---|---|
| EP | 241322 A * | 10/1987 | E05G 1/14 |
| EP | 0408522 A2 | 1/1991 | |
| EP | 1462021 A1 * | 9/2004 | |
| EP | 2455920 A1 * | 5/2012 | |
| EP | 2659800 B1 | 2/2018 | |
| EP | 3470608 A1 * | 4/2019 | |
| FR | 2832171 A1 * | 5/2003 | |
| WO | 03091525 A1 | 11/2003 | |

* cited by examiner

US 11,871,824 B2

SYSTEMS AND METHODS FOR A CARRIER BAG

CROSS-REFERENCE TO RELATED APPLICATIONS

This application is a national stage entry of PCT Application No. PCT/US2019/019341, which was filed 25 Feb. 2019 and claims priority to U.S. Provisional Application No. 62/634,948, which was filed 26 Feb. 2018. The entire disclosures of both applications are incorporated herein by reference.

FIELD OF EMBODIMENTS OF THE DISCLOSURE

Embodiments of the present disclosure relate to a carrier bag for transportation of cash within a carrier box.

BACKGROUND

Typically, sealable bags are used to carry cash, which is sealed and positioned within a carrier box. When an unauthorized operator accesses the carrier box, the carrier coats the cash with permanent ink.

However, the sealable bags may be susceptible to damage when empty or full. Additionally, the sealable bags are not reusable and have a high cost per unit.

SUMMARY OF EMBODIMENTS OF THE DISCLOSURE

A need exists for a robust and reusable carrier bag.

With that need in mind, certain embodiments of the present disclosure provide a carrier bag. The carrier bag includes an outer mesh including a seal and a set of holes along an outer surface area. The carrier bag includes an inner liner configured to be waterproof. The inner liner is within an interior surface area of the outer mesh. The inner liner is configured to be penetrated by hollow nails of an injection mechanism of a carrier box.

Optionally, the hollow nails are configured to traverse through the set of holes of the outer mesh and into the inner liner. Additionally or alternatively, the hollow nails include an internal channel operatively coupled to an ink reservoir. The internal channel is configured to pass ink through the internal channel and into the inner liner. Optionally, the hollow nails have diameters smaller than the set of holes.

Additionally or alternatively, the inner liner is formed by at least one of Ethylene-vinyl acetate, Polyvinyl chloride, or polythene. Optionally, the inner liner has a thickness of 0.1 mm. Additionally or alternatively, the set of holes of the outer mesh are bounded by boundaries. The boundaries being configured to protect the inner liner. Optionally, the seal includes at least one of a zipper, fasteners, Velcro, or magnets. Additionally or alternatively, the injection mechanism comprises at least one of a pneumatic system, one or more processors, or an actuator.

In an embodiment, a carrier assembly is provided. The carrier assembly includes a carrier bag. The carrier bag including a seal, and a set of holes along an outer surface area. The carrier bag includes an inner liner configured to be waterproof. The inner liner is within an interior surface area of the outer mesh. The inner liner is configured to be penetrated by hollow nails of an injection mechanism of a carrier box. The carrier assembly includes the carrier box. The carrier box is configured to have a compartment. The compartment is configured to contain the carrier bag. The carrier box includes an array of hollow nails of the injection mechanism. The hollow nails are positioned along a bottom of the compartment, and a lid of the carrier box. The hollow nails are configured to penetrate the inner liner. The hollow nails include an internal channel operatively coupled to an ink reservoir. The internal channel is configured to pass ink through the internal channel and into the inner liner.

Additionally or alternatively, the carrier box includes a lock configured to position latches of the carrier box. The lock may be or include at least one of a radio frequency identification lock, a fingerprint lock, a barcode lock, a keycard lock, a fastener, or a key lock. Optionally, the hollow nails are configured to traverse through the set of holes of the outer mesh and into the inner liner. The hollow nails including sharpened edges at distal ends of the hollow nails. The sharpened edges are configured to penetrate the inner liner. Optionally, the carrier box includes a lip. The lip is configured to prevent one or more protrusions from entering between a housing and the lid of the carrier box.

Optionally, the inner liner is formed by at least one of Ethylene-vinyl acetate, Polyvinyl chloride, or polythene. Additionally or alternatively, the inner liner has a thickness of 0.1 mm. Optionally, the set of holes of the outer mesh are bounded by boundaries. The boundaries being configured to protect the inner liner. Optionally, the seal is at least one of a zipper, fasteners, Velcro, or magnets. Additionally or alternatively, the carrier box includes one or more sensors. The sensors being configured to identify unauthorized access to the carrier box. Optionally, the injection mechanism comprises at least one of a pneumatic system, one or more processors, or an actuator.

In an embodiment, a carrier assembly is provided. The carrier assembly includes a carrier bag. The carrier bag having an outer mesh including a seal. The seal including at least one of a zipper, fasteners, Velcro, or magnets. The outer mesh is configured to have a set of holes along an outer surface area of the outer mesh. The set of holes are bounded by boundaries. The boundaries being configured to protect an inner liner. The carrier bag having the inner liner configured to be waterproof, and is within an interior surface area of the outer mesh. The inner liner is configured to be penetrated by hollow nails of an injection mechanism of a carrier box. The inner liner is formed by at least one of Ethylene-vinyl acetate, Polyvinyl chloride, or polythene. The carrier assembly includes the carrier box. The carrier box is configured to have a compartment. The compartment is configured to contain the carrier bag. The carrier box including an array of hollow nails of the injection mechanism. The hollow nails are configured to traverse through the set of holes of the outer mesh and into the inner liner. The hollow nails are positioned in an array along a bottom of the compartment and a lid of the carrier box. The hollow nails are configured to penetrate the inner liner of the carrier bag. The hollow nails include an internal channel operatively coupled to an ink reservoir. The internal channel is configured to pass ink through the internal channel and into the inner liner. The injection mechanism comprises at least one of a pneumatic system, one or more processors, or an actuator.

Figure 1:
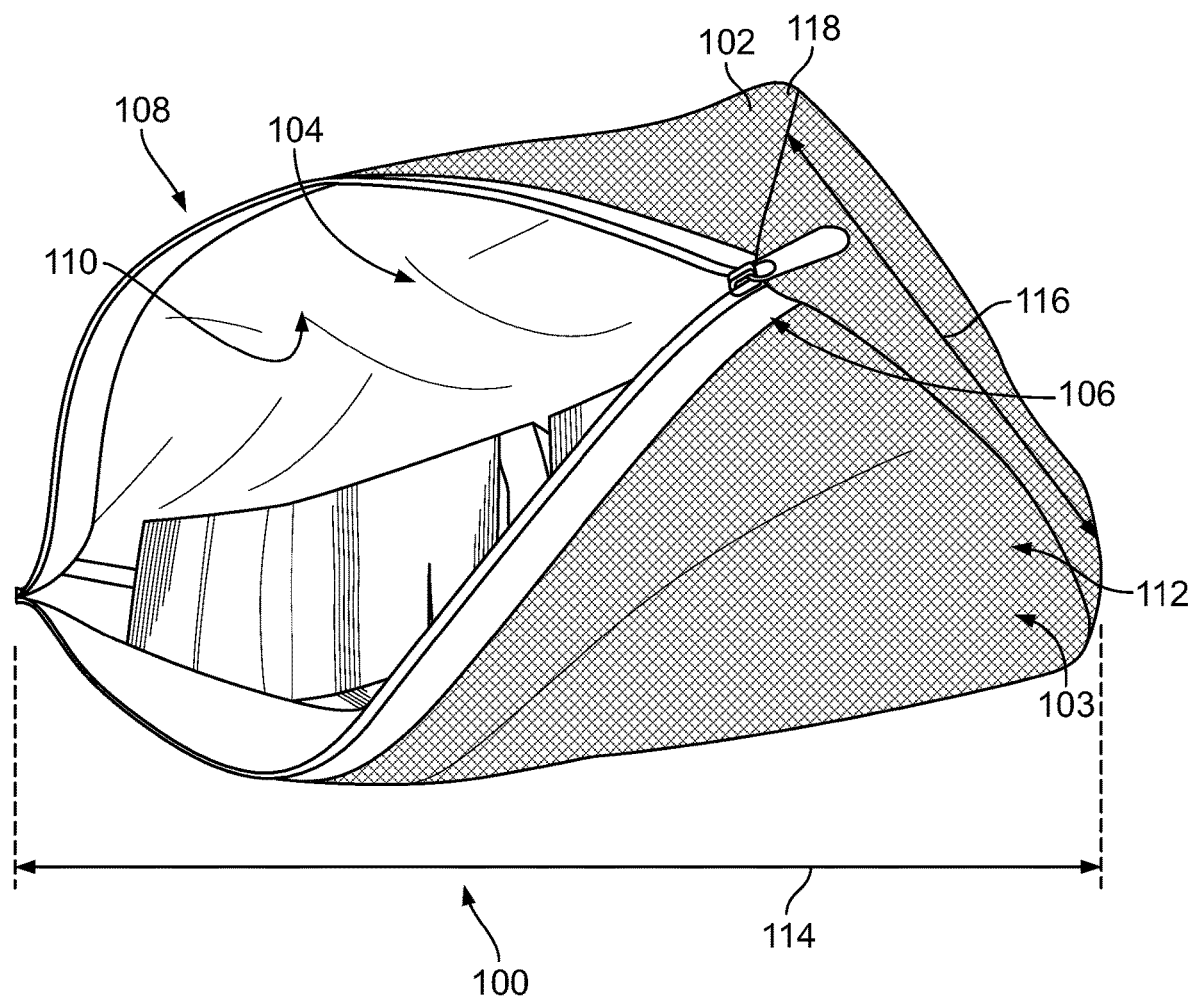
FIG. 1 illustrates a perspective view of a carrier bag, in accordance with an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Certain embodiments of the present disclosure provide a carrier bag. The carrier bag is a multi-wall bag. For example, the multi-wall bag includes an outer mesh and an inner liner. The outer mesh houses and/or surrounds the inner liner. The outer mesh may include a seal. The seal may be or include a zipper, fasteners, Velcro, magnets, or the like. The outer mesh is further configured to protect the inner liner by preventing the inner liner from being punctured. For example, the outer mesh prevents punctures to the inner liner, which allows the carrier bag to be reusable. The inner liner is configured to be punctured by an injection mechanism of a carrier box, which passes through the outer mesh. Optionally, a thickness of the inner liner is 0.1 mm. The thickness of the inner liner may be greater than 0.1 mm. The inner liner is configured to be waterproof. For example, the inner liner is configured to contain ink that is emitted and/or received from the injection mechanism within the inner liner.

FIG. 1 illustrates a peripheral view of a carrier bag 100, in accordance with an embodiment of the present disclosure. The carrier bag 100 includes an outer mesh 102. The outer mesh 102 is configured to be overlaid on an outer surface area 103 of the carrier bag 100. The outer mesh 102 may be formed by connected strands of fabric, metal, plastic, and/or the like. The outer mesh 102 includes a series of holes 112 along an outer surface area 103 of the outer mesh 102. The holes 112 are configured to allow a hollow nail 401 (shown in FIG. 4) to penetrate through the outer mesh 102 and pierce an inner liner 104 within the carrier bag 100. The holes 112 of the outer mesh 102 are bounded by boundaries 118 of the fabric, the metal, the plastic, and/or the like.

The outer mesh 102 provides a barrier, which protects the inner liner 104. For example, the boundaries 118 of the holes 112 may be the fabric, the metal, the plastic, and/or the like.

The boundaries 118 are configured to protect the inner liner 104. For example, the strands of the fabric, the metal, the plastic, and/or the like covers a portion of the inner liner 104. The covered portion of the inner liner 104 by the boundaries 118 provide a barrier configured to protect the inner liner 104 responsive to being scratched, pierced, punctured, and/or the like by adjacent objects in contact with the carrier bag 100. The boundaries 118 provide outer protection, which protects the inner liner 104 and allows the carrier bag 100 to be reusable.

The outer mesh 102 includes a seal 106 configured to close an opening 108 of the carrier bag 100. The seal 106 is shown as a zipper in FIG. 1. Additionally or alternatively, the seal 106 may be or include a series of magnets aligned along the opening 108. Optionally, the seal 106 may be or include fasteners along the opening 108. For example, the fasteners may be or include buttons, snap fasteners, buckles, clips, and/or the like. Additionally or alternatively, the seal 106 may be or include Velcro aligned along the opening 108.

An interior surface area 110 of the outer mesh 102 extends within the carrier bag 100. The interior surface area 110 of the outer mesh 102 includes the inner liner 104, which provides a multi-wall carrier bag 100 (e.g., the inner liner 104, the outer mesh 102). The inner liner 104 is configured to extend along the interior surface area 110 of the outer mesh 102.

The inner liner 104 provides a barrier that may be waterproof. For example, the inner liner 104 is coupled to the seal 106 of the outer mesh 102. The inner liner 104 and/or the seal 106 are configured to form a barrier that prevents water and/or ink from escaping through the seal 106 and/or the inner liner 104. For example, the inner liner 104 may be coupled to the seal 106. The seal 106 is further configured to enclose the inner liner 104 and the outer mesh 102, such that the water and/or ink housed within the inner liner 104 may not leak through the inner liner 104 and the seal 106. Responsive to the seal 106 being sealed and/or enclosed, the inner liner 104 and/or the seal 106 are waterproof. For example, opposing sides of the seal 106 are coupled to the inner liner 104. The sealing of the inner liner 104 provides a waterproof seal of the inner liner 104. For example, ink and/or water within the inner liner 104 may not pass through the seal 106 and/or the inner liner 104.

The inner liner 104 can include and/or be formed by at least one of an Ethylene-vinyl acetate, a Polyvinyl chloride, a polyethylene, metallocene polyethylene, a polyester film, and/or the like. The hollow nails 401 (shown in FIG. 4) are configured to penetrate the inner liner 104. For example, the hollow nails 401 are configured to pass through the holes 112 of the outer mesh 102. The hollow nails 401 are configured to have a diameter that is less than the holes 112. At distal ends 404 of the hollow nails 401 are sharpened points 412. The sharpened points 412 of the hollow nails 401 penetrate and pass through the inner liner 104.

A thickness of the inner liner 104 may affect the protection of the boundaries 118 of the outer mesh 102. For example, responsive to a thickness of less than 0.1 mm the inner liner 104 can be torn or damaged when entering and/or leaving the carrier box 200 (shown in FIG. 2), and/or the carrier bag 100 being carried by the operator. For example, the thickness of the inner liner 104 may be damaged with the boundaries, such as in direct contact with other objects. For example, the thickness of the inner liner 104 may be scratched, pierced, punctured, and/or the like by objects in direct contact with the carrier bag 100.

Additionally or alternatively, the thickness of the inner liner 104 may be thick. For example, responsive to a thickness of the inner liner 104 greater than 20 mm. The thickness of the inner liner 104 may prevent the hollow nails 401 from penetrating the inner liner 104. For example, the hollow nails 401 are formed from a flexible material. The hallow nails 401 may bend responsive to contact with the thickness of the inner liner 104.

Optionally, the inner liner 104 may have a thickness of 0.1 mm. Additionally or alternatively, the inner liner 104 may have a thickness greater than 0.1 mm.

The carrier bag 100 has dimensions corresponding to a length 114 and a height 116. The dimensions of the carrier bag 100 may correspond to dimensions of the outer mesh 102. The dimensions of the carrier bag 100 are configured to fit within a compartment 202 of the carrier box 200 (shown in FIG. 2). For example, the dimensions of the carrier bag 100 are configured such that the carrier bag 100 can be positioned within the carrier box 200.

Figure 2:
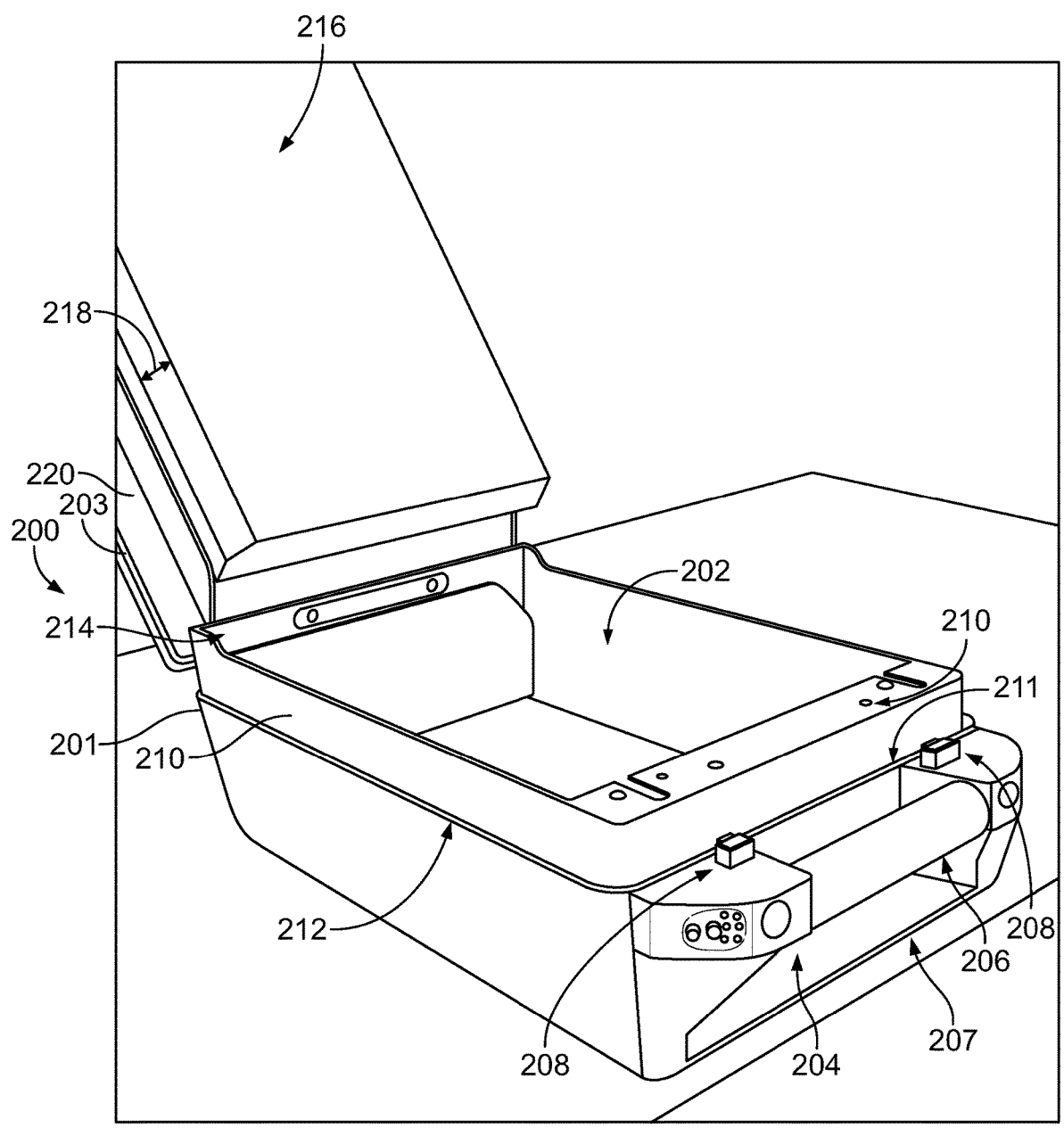
FIG. 2 illustrates a perspective view of a carrier box, in accordance with an embodiment of the present disclosure.

FIG. 2 illustrates a peripheral view of the carrier box 200, in accordance with an embodiment of the present disclosure. The carrier box 200 includes a housing 201 and a lid 203. The lid 203 is coupled to the housing 201 by hinges 214. The housing 201 includes the compartment 202 configured to hold the carrier bag 100. The lid 203 may be fastened and/or locked to the housing 201. For example, the hinges 214 are configured to allow the lid 203 to close towards the housing 201. The hinges 214 direct the lid 203 toward the lip 210 and/or a handle 207.

Optionally, the lid 203 may include a head 216. The head 216 may include foam, bubble wrap, a cushion, and/or the like. The head 216 is configured to suppress the movement of the carrier bag 100 within the compartment 202. For example, the head 216 is configured to have additional height 218. The additional height 218 directly abuts the carrier bag 100 within the compartment 202. The additional height 218 allows the head 216 to reduce movement of the carrier bag 100 within the compartment 202.

The lid 203 seals the compartment 202. For example, the hinges 214 of the carrier box 200 direct the lid 203 towards the housing 201. The compartment 202 may be or include the interior surface of the housing 201. For example, the compartment 202 is configured to have dimensions that allow the carrier bag 100 to be positioned within the housing 201.

Extending from the housing 201 is the handle 207, a lip 210, and one or more latches 208. The lip 210 extends along a surface area 212 of the housing 201. The lip 210 is configured to be positioned adjacent to the lid 203. For example, the lip 210 increases a height of the housing 201 and/or the compartment 202. The lip 210 is displaced a distance 211 from an edge of the housing 201. For example, the lid 203 includes a channel 220 along an outer circumference of the lid 203. The channel 220 is configured to receive the lip 210. Responsive to the lid 203 being closed, the lip 210 is received by the channel 220 and is positioned directly adjacent to the lid 203.

Optionally, the lip 210 is configured to provide an additional edge that prevents protrusions (e.g., screwdriver, pen, knife, crowbar) from entering between the housing 201 and the lid 203. For example, the height of the lip 210 is positioned to block protrusions from entering between the lid 203 and the housing 210. The additional edge of the lip 210 is positioned between the housing 201 and the lid 203. Responsive to the lid 203 being closed, the additional edge is configured to block protrusions from entering between the housing 201 and the lid 203.

The latches 208 are shown positioned on top of the handle 206. It may be noted that the latches 208 may be positioned on the lip 210, along the surface area 212, and/or the like. The latches 208 are configured to couple the lid 203 to the housing 201. For example, the latches 208 are configured to enter apertures (not shown) of the lid 203, which lock the lid 203 to the housing 201. The latches 208 are displaced responsive to activation of the lock 204. For example, responsive to the lock 204 being activated (e.g., locked), the latches 208 expand within the apertures to couple the lid 203 to the housing 201.

The handle 207 includes a lever 206 and a lock 204. The lever 206 may be or include a fulcrum. The lever 206 is configured to open the lid 203, responsive to the lock 204 being unlocked. For example, the lever 206 is configured to retract the latches 208 from the apertures of the lid 302. The operation of the lever 206 is based on the lock 204. Additionally or alternatively, the lever 206 may be electronic. For example, the lever 206 is activated and/or powered responsive to the lock 204 being unlocked.

The lock 204 is configured to obstruct the latches 208 responsive to being activated (e.g., locked). The lock 204 is configured to lock the housing 201 to the lid 203. The lock 204 may be or include a radio frequency identification (RFID) lock, a fingerprint lock, a barcode lock, a keycard lock, a fastener (e.g., having a unique head to unscrew the fastener), a key lock, and/or the like. Additionally or alternatively, the lock 204 may be a combination of one or more types of locks. For example, the lock 204 may be or include the RFID lock and the fingerprint lock. The lock 204 is configured to be accessible to authorized persons to gain access to the carrier box 200. For example, the lock 204 is configured to be unlocked in response to receiving an approved RFID sequence, the fingerprint, the barcode, the keycard, the key, and/or the like. The lock 204 may be operably coupled to a memory that is configured to store the approved the RFID sequence, the fingerprint, the barcode, the keycard, or the like. Additionally or alternatively, the lock 204 may be or include the key, which may not be stored in the memory. For example, the key is configured to unlock the lock 204 manually.

Figure 3:
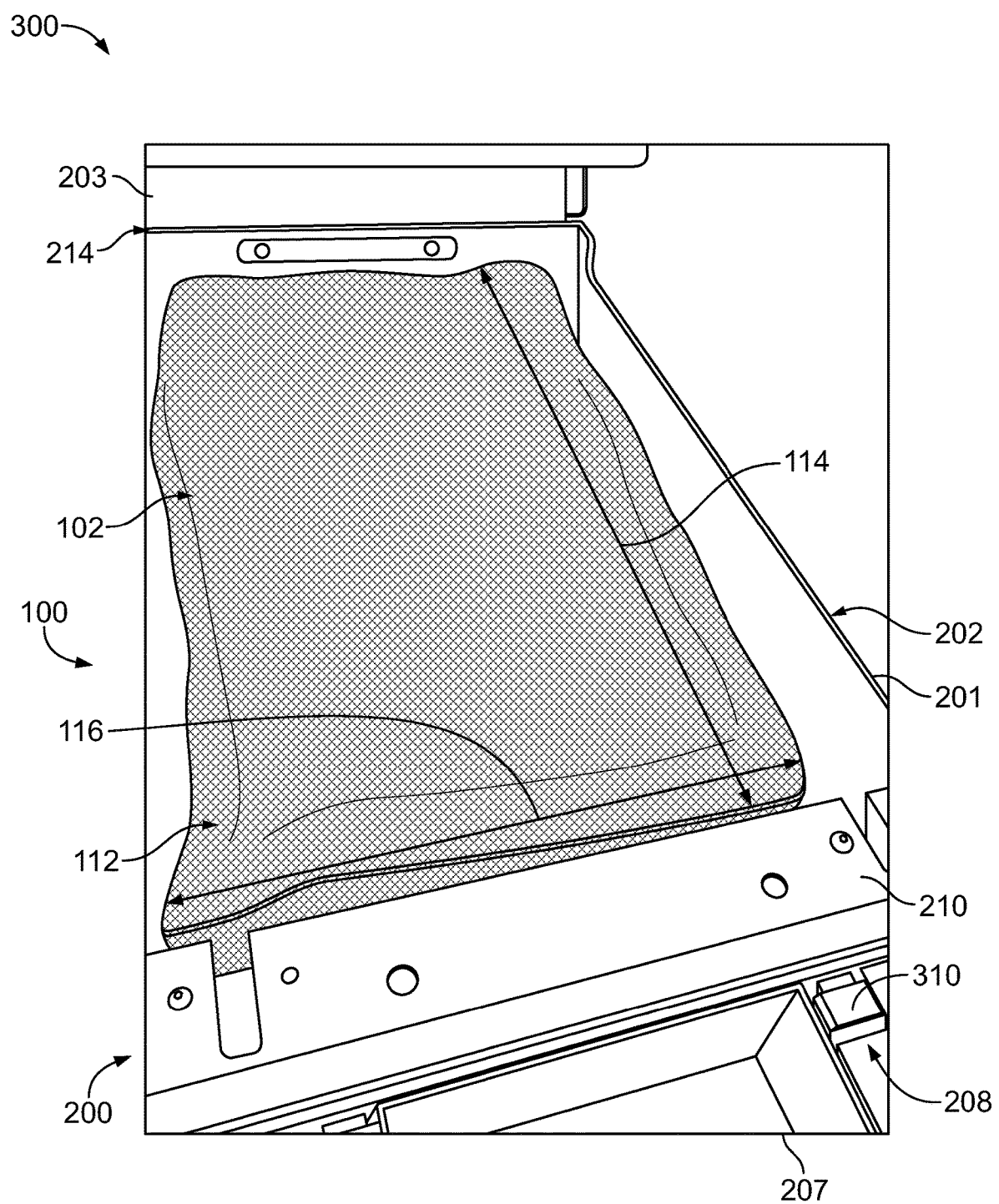
FIG. 3 illustrates a perspective view of a carrier assembly, in accordance with an embodiment of the present disclosure.

FIG. 3 illustrates a peripheral view of a carrier assembly 300, in accordance with an embodiment of the present disclosure. For example, the carrier bag 100 with the carrier box 200 may provide the carrier assembly 300. The carrier bag 100 is configured to be positioned within the carrier box 200. For example, dimensions of the carrier bag 100 are configured to allow the carrier bag 100 to be positioned within the compartment 202. The compartment 202 may have dimensions similar to and/or the same as the dimensions (e.g., length 114, height 116) of the carrier bag 100.

Responsive to the lid 203 closing along a direction of the hinges 214, the lock 204 is activated. The latches 208 enter the housing through the apertures of the lid 203. Responsive to the lock 204 activating, the latches 208 are displaced a distance 310. The distance 310 couples the lid 203 to the housing 201. For example, the distance 310 repositions the latches 208 within the lid 203, which locks the lid 203 to the housing 201. The repositioning of the latches 208 obstruct the apertures of the lid 203, and couples the lid 203 to the housing 201.

Figure 4:
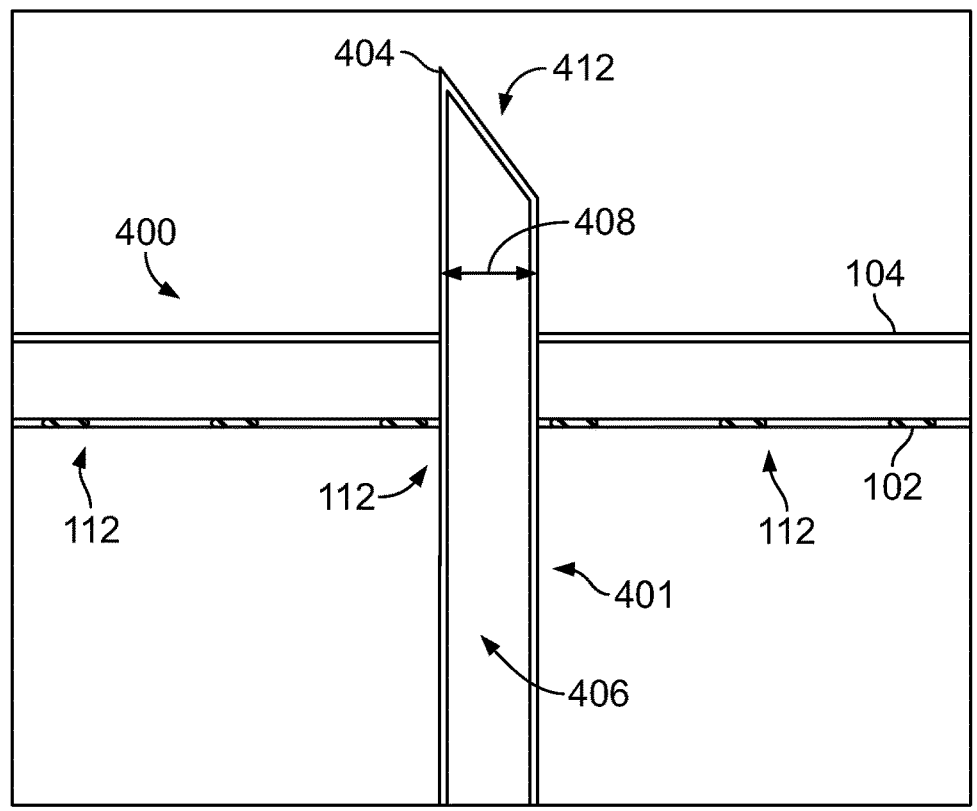
FIG. 4 illustrates a lateral view of a hollow nail of an injection mechanism, in accordance with an embodiment of the present disclosure.

The carrier box 200 includes an injection mechanism 400 (shown in FIG. 4). The injection mechanism 400 is configured to pierce the inner liner 104 and inject ink into the carrier bag 100. For example, responsive to opening of the lid 203 while the lock 204 is activated, the injection mechanism 400 injects ink within the carrier bag 100.

FIG. 4 illustrates the hollow nail 401 of the injection mechanism 400 of the carrier box 200, in accordance with an embodiment of the present disclosure. The carrier box 200 includes one or more hollow nails 401 (e.g., 4 or more) of the injection mechanism 400. The hollow nails 401 are configured to have a diameter 408 that allows the hollow nails 401 to pass through the holes 112 of the outer mesh 102. The hollow nails 401 can include Polypropylene, a synthetic plastic, and/or the like, which are flexible materials. The hollow nails 401 may be positioned along an array along a bottom of the compartment 202 and the lid 203. Responsive to activation of the injection mechanism 400, the hollow nails 401 are directed towards each other. For example, the hollow nails 401 are directed at each other along opposing directions from the bottom of the compartment 202 and the lid 203. The hollow nails 401 are directed at each other towards the carrier bag 100.

Sharpened points 412 are provided at distal ends 404 of the hollow nails 401. The sharpened points 412 are configured to traverse through the holes 112 of the outer mesh 102. The sharpened points 412 are configured to penetrate the inner liner 104. For example, the sharpened points 412 pierce the inner liner 104 such that portions of the hollow nails 401 are within the carrier bag 100.

The inner liner 104 is configured to have a thickness such that the hollow nails 401 can penetrate the inner liner 104. For example, responsive to the injection mechanism 400 activating, the hollow nails 401 are directed towards the carrier bag 100. The sharpened points 412 of the hollow nails 401 penetrate the inner liner 104 and inject ink into the carrier bag 100. In another example, when the inner liner 104 is thick (e.g., greater than 20 mm) the hollow nails 401 may bend away from the inner liner 104. Due to the thickness of the inner liner 104, the hollow nails 401 may not penetrate the inner liner 104.

The hollow nails 401 may be or include a cylinder having an internal channel 406 within the hollow nails 401. For example, the internal channel 406 is configured to allow ink to flow from an ink reservoir 502 (FIGS. 5A-C) through the inner liner 104. The ink is configured to damage the contents of the carrier bag 100. For example, the carrier bag 100 may include one or more sets of cash. The ink damages the cash within the carrier bag 100, which impairs the usability of the cash.

Figure 5A:
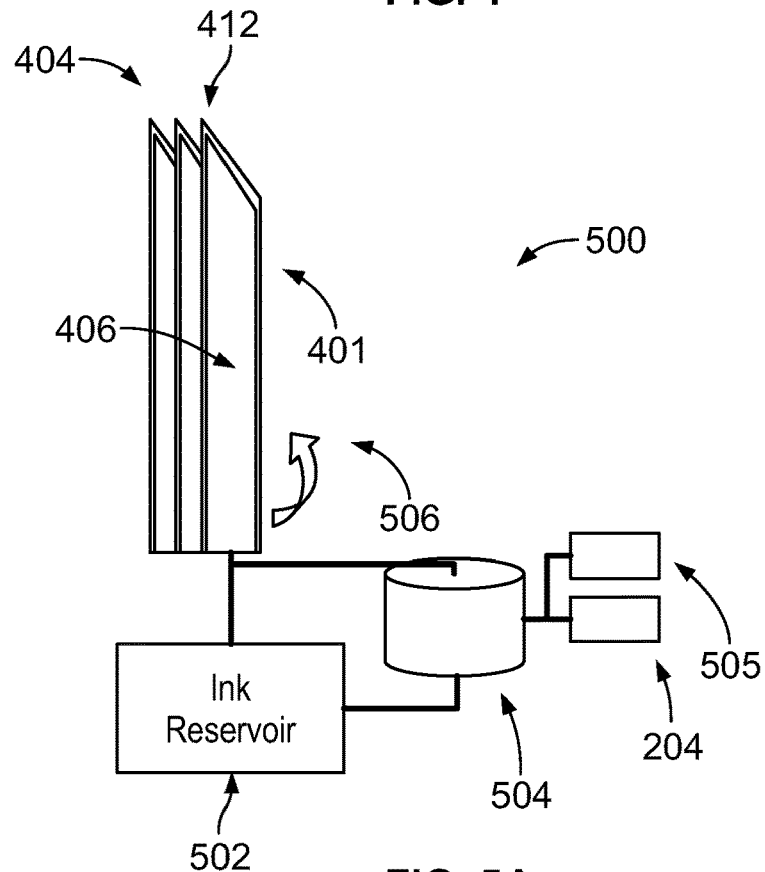
FIG. 5A illustrates a first schematic view of an injection mechanism of the carrier box, in accordance with embodiments of the present disclosure.
Figure 5B:
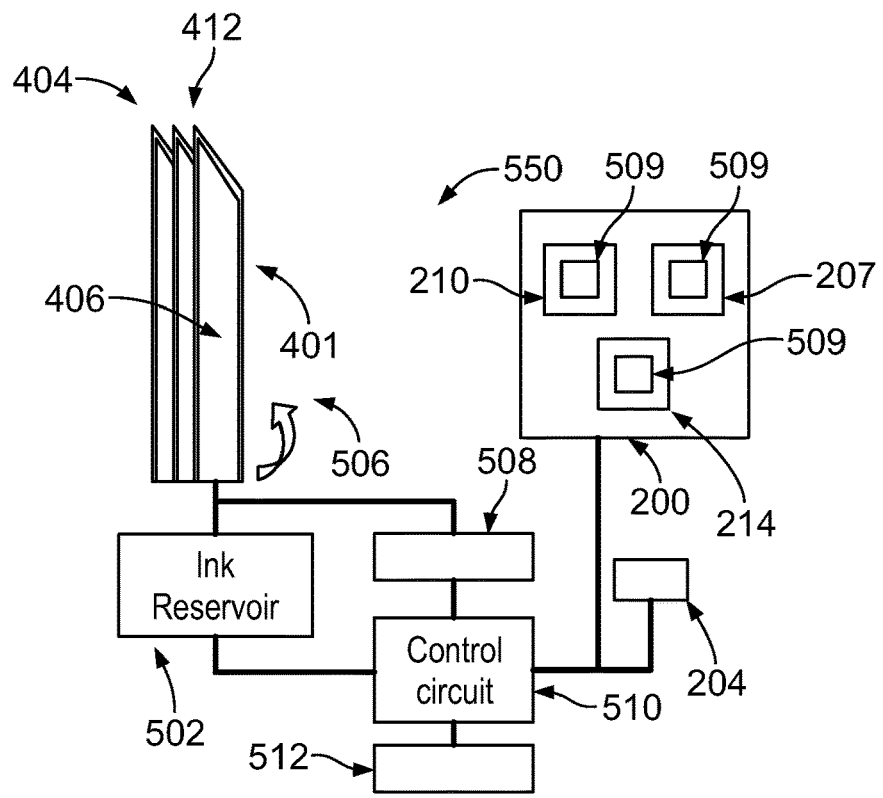
FIG. 5B illustrates a second schematic view of an injection mechanism of the carrier box, in accordance with embodiments of the present disclosure.
Figure 5C:
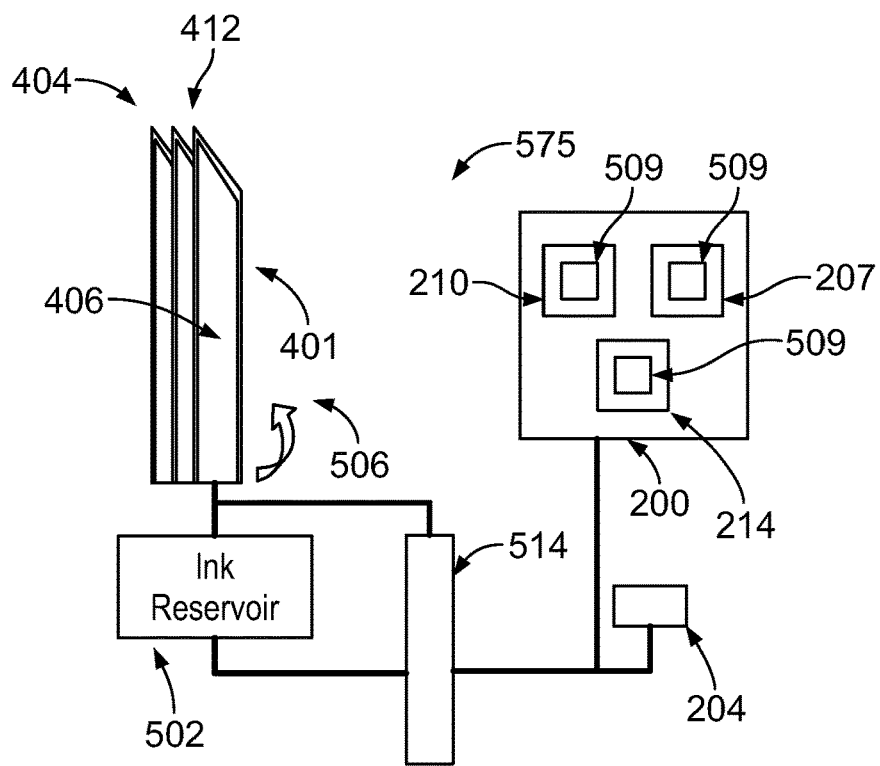
FIG. 5C illustrates a third schematic view of an injection mechanism of the carrier box, in accordance with embodiments of the present disclosure.

FIGS. 5A-C illustrate schematic views of different injection mechanisms 500, 550, 575 of the carrier box 200, in accordance with embodiments of the present disclosure. The injection mechanisms 500, 550, 575 illustrate different methods to activate the injection mechanisms 500, 550, 575 of the carrier box 200.

FIG. 5A illustrates the injection mechanism 500 utilizing a pneumatic system, which pressurizes the ink and the hollow nails 401. The injection mechanism 500 includes a container 504 of high-pressure air (e.g., compressed air). For example, the container 504 may include high-pressure air above 300 kPa. The container 504 is operably coupled to the ink reservoir 502 and the hollow nails 401. Responsive to the activation of the lock 204 of the carrier box 200, the injection mechanism 500 is armed. For example, the injection mechanism 500 may be configured to direct the hollow nails 401 towards the carrier bag 100 based on a detection by the pressure sensor 505.

The pressure sensor 505 is configured to monitor pressure between the lid 203 and the housing 201. Responsive to the lid 203 and the housing 201 being locked by the lock 204, the pressure sensor 505 is activated. For example, the pressure sensor 505 detects an increased pressure, such as above 0 kPa, between the lid 203 and the housing 201. The pressure sensor 505 may detect the activation of the lock 204 based on a control signal received from the lock 204. For example, the control signal may be or include an analog signal and/or digital signal indicating the activation of the lock 204.

The pressure sensor 505 monitors the pressure between the lid 203 and the housing 201. Responsive to the pressure sensor 505 detecting a drop in pressure between the lid 203 and the housing 201, an indication of the lid 203 being opened may be provided. The pressure sensor 505 may transmit a signal (e.g., an analog signal and/or digital signal) to the container 504. The signal indicates to the container 504 to release the high-pressure air to the hollow nails 401 and/or the ink reservoir 502.

For example, the container 504 is operatively coupled to the hollow nails 401. Responsive to receiving the high-pressure air of the signal from the pressure sensor 505, the container 504 directs the high-pressure air towards the hollow nails 401. The hollow nails 401 along the array of the bottom of the compartment 202 and the lid 203 are directed at opposing directions towards the carrier bag 100. For example, the high-pressure air adjusts a position of the hollow nails 401. The hollow nails 401 are directed along an arrow 506 towards the carrier bag 100. The hollow nails 401 traverses through the holes 112 of the outer mesh 102. The sharpened points 412 at the distal ends 404 of the hollow nails 401 penetrate the inner liner 102. For example, the sharpened points 412 allow portions of the hollow nails 401 to be positioned within the carrier bag 100.

Additionally or alternatively, the container 504 provides high-pressure air to the ink reservoir 502. The high-pressure air generates a pressure differential between the ink reservoir 502 and the internal channel 406. For example, the increase in the pressure within the ink reservoir 502 is more than a pressure within the internal channel 406 and/or the carrier bag 100. The pressure differential propels the ink from the ink reservoir 502 through the internal channel 406, and into the carrier bag 100. The ink is configured to mark and/or destroy the contents of the interior surface area 110 of the carrier bag 100.

FIG. 5B illustrates the injection mechanism 550 utilizing a control circuit 510. As used herein, the term "control circuit," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only and are thus not intended to limit in any way the definition and/or meaning of such terms. For example, the control circuit 510 may be or include one or more processors that are configured to control operation of the injection mechanism 550, as described herein.

The control circuit 510 is configured to execute a set of instructions that are stored in one or more data storage units or elements (such as one or more memories 512), in order to process data. For example, the control circuit 510 may include or be coupled to the one or more memories 512. The data storage units may also store data or other information as desired or needed. The data storage units may be in the form of an information source or a physical memory element within a processing machine.

The set of instructions may include various commands that instruct the control circuit 510 to perform specific operations such as the methods and processes of the various embodiments of the subject matter described herein. The set of instructions may be in the form of a software program.

The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units. It is to be understood that the processing or control units may represent circuits, circuitry, or portions thereof that may be implemented as hardware with associated instructions (e.g., software stored on a tangible and non-transitory computer-readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, one or more processors, controllers, or the like. Optionally, the one or more control or processing units may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

The control circuit 510 is operatively coupled to one or more memories 512. The memories 512 may include information relating to the lock 204. For example, the memories 512 may include information that is configured to store the approved the RFID sequence, the fingerprint, the barcode, the keycard, or the like. The control circuit 510 may compare the received information from the lock 204 with the memories 512. Responsive to a match stored in the memories 512, the control circuit 510 instructs the lock 204 to unlock and/or release the latches 208 from the lid 203.

The control circuit 510 is operatively coupled to one or more sensors 509. Optionally, the sensors 509 may include a pressure sensor similar to and/or the same as the pressure sensor 505. Additionally or alternatively, the sensors 509 may be or include a proximity sensor, a load cell, a Hall Effect sensor, a torque sensor, and/or the like. The sensors 509 may be positioned along the lip 210, the handle 207, the hinges 214, and/or the like. The sensors 509 are configured to identify a condition of the carrier box 200. For example, the sensors 509 may detect protrusions entering between the lid 203 and the housing 201, unauthorized access (e.g., opening the lid 203 while the lock 204 is activated), and/or the like of the carrier box 200.

For example, the torque sensor, shown as the sensor 509 positioned proximate to the hinges 214. The torque sensor is configured to detect a rotational force applied between the lid 203 and the housing 201. For example, the torque sensor may detect one or more protrusions entering between the lid 203 and the housing 201. The protrusions may generate a rotational force, which is detected by the torque sensor. Responsive to the rotational force detected by the torque sensor, the control circuit 510 may activate the injection mechanism 550.

In another example, the load sensor, the Hall Effect sensor, and/or the proximity sensor may be positioned along the lip 210, the handle 207, and/or the like. The sensors 509 are configured to detect an amount of contact between the lid 203 and the housing 201. The contact can be measured as a load applied between the lid 203 and the housing 201, a magnetic field between the lid 203 and the housing 201, proximity between the lid 203 and the housing 201, and/or the like. Responsive to the opening of the lid 203 detected by the sensors 509, the control circuit 510 may activate the injection mechanism 550.

The control circuit 510 is operatively coupled to one or more actuators 508. The actuators 508 may be or include an electric motor, a pneumatic device, or the like. The actuators 508 are operatively coupled to the hollow nails 401 and the ink reservoir 502. For example, the control circuit 510 activates the actuators 508 responsive to detections monitored by the sensor 509. The detection may relate to a rotational force detected at the hinges 214 and/or opening of the lid 203 while the lock 204 is activated.

The actuators 508 are configured to re-position the hollow nails 401. For example, the actuators 508 reposition the hollow nails 401 along the arrow 506 and direct the hollow nails 401 toward the carrier bag 100. The hollow nails 401 traverses through the holes 112 of the outer mesh 102. The sharpened points 412 at the distal ends 404 of the hollow nails 401 penetrate the inner liner 102. For example, the sharpened parts 412 allow portions of the hollow nails 401 to be positioned within the carrier bag 100.

Additionally or alternatively, the actuators 508 may further apply pressure to the ink reservoir 502. For example, the actuators 508 may actuate a piston, a hydraulic cylinder, and/or the like within the ink reservoir 502. The actuators 508 generate pressure within the ink reservoir 502. The pressure generated by the actuators 508 creates a pressure differential between the ink reservoir 502 and the internal channel 406. For example, the increase in the pressure within the ink reservoir 502 is more than a pressure within the internal channel 406. The pressure differential propels the ink from the ink reservoir 502 through the internal channel 406, and into the carrier bag 100. The ink is configured to mark and/or destroy the contents of the interior surface area 110 of the carrier bag 100.

FIG. 5C illustrates the injection mechanism 575 utilizing an actuator 514. For example, the actuator 514 may be or include an electric motor, pneumatic device, and/or the like. For example, the actuator 514 is operatively coupled to the hollow nails 401 and the ink reservoir 502. The actuator 514 is operatively coupled to one or more sensors 509 and the lock 204. The sensors 509 may be similar to and/or the same as the sensors 509 of the injection mechanism 550. The actuator 514 may be activated based on activation of the lock 504 and/or the detection by the sensors 509. For example, the sensors 509 may generate signals based on detection of the lid 203 being opened relative to the housing 201, one or more protrusions detected between the lid 203 and the housing 201, or the like. Responsive to the activation of the lock 504 and the detection by the sensors 509, the actuator 514 is activated.

For example, responsive to the actuator 514 being activated 514, the actuator 514 re-positions the hollow nails 401. The actuator 514 re-positions the hollow nails 401 along the arrow 506, and direct the hollow nails 401 toward the carrier bag 100. The hollow nails 401 traverses through the holes 112 of the outer mesh 102. The sharpened points 412 at the distal ends 404 of the hollow nails 401 penetrate the inner liner 102, which allow portions of the hollow nails 401 to be positioned within the carrier bag 100.

Additionally or alternatively, the actuator 514 may further apply pressure to the ink reservoir 502. For example, the actuator 514 may actuate a piston, a hydraulic cylinder, and/or the like of the ink reservoir 502, which generates pressure within the ink reservoir 502. The pressure generates a pressure differential between the ink reservoir 502 and the internal channel 406. For example, the increase in the pressure within the ink reservoir 502 is more than a pressure within the internal channel 406 and/or the carrier bag 100. The pressure differential propels the ink from the ink reservoir 502 through the internal channel 406, and into the carrier bag 100. The ink is configured to mark and/or destroy the contents of the interior surface area 110 of the carrier bag 100.

Embodiments of the present disclosure provide a carrier bag that is configured to be positioned within a carrier box. The carrier bag is a multi-wall bag that includes an outer mesh and an inner liner. The carrier bag includes a waterproof seal for containing ink within the carrier bag.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A carrier assembly, comprising:
   a carrier box comprising:
      a compartment;
      a lid; and
      an injection mechanism including hollow nails positioned along a bottom of the compartment and the lid.

2. The carrier assembly of claim 1, further comprising a carrier bag configured to be contained within the compartment, the carrier bag including:
   an outer mesh including a seal, and a set of holes along an outer surface area; and
   an inner liner configured to be waterproof, wherein the inner liner is within an interior surface area of the outer mesh, the inner liner being configured to be penetrated by the hollow nails.

3. The carrier assembly of claim 2, wherein the hollow nails are configured to traverse through the set of holes of the outer mesh and into the inner liner.

4. The carrier assembly of claim 3, wherein the hollow nails include an internal channel operatively coupled to an ink reservoir, the internal channel is configured to pass ink through the internal channel and into the inner liner.

5. The carrier assembly of claim 3, wherein the hollow nails have diameters smaller than the set of holes.

6. The carrier assembly of claim 2, wherein the inner liner is formed by one or more of Ethylene-vinyl acetate, Polyvinyl chloride, or polythene.

7. The carrier assembly of claim 2, wherein the inner liner has a thickness of 0.1 mm.

8. The carrier assembly of claim 2, wherein the set of holes of the outer mesh are bounded by boundaries, the boundaries being configured to protect the inner liner.

9. The carrier assembly of claim 2, wherein the seal includes one or more of a zipper, fasteners, a hook and loop fastener, or magnets.

10. The carrier assembly of claim 2, wherein the injection mechanism further comprises one or more of a pneumatic system, one or more processors, or an actuator.

11. A carrier assembly comprising:
   a carrier bag, the carrier bag including a seal, and a set of holes along an outer surface area, the carrier bag including an inner liner configured to be waterproof, wherein the inner liner is within an interior surface area of the outer mesh, the inner liner being configured to be penetrated by hollow nails of an injection mechanism of a carrier box; and
   the carrier box is configured to have a compartment, the compartment is configured to contain the carrier bag, the carrier box including an array of hollow nails of an injection mechanism, the hollow nails are positioned along a bottom of the compartment and a lid of the carrier box, the hollow nails are configured to penetrate the inner liner, wherein the hollow nails include an internal channel operatively coupled to an ink reservoir, the internal channel is configured to pass ink through the internal channel and into the inner liner.

12. The carrier assembly of claim 11, wherein the carrier box includes a lock configured to position latches of the carrier box, the lock comprising one or more of a radio frequency identification lock, a fingerprint lock, a barcode lock, a keycard lock, a fastener, or a key lock.

13. The carrier assembly of claim 11, wherein the hollow nails are configured to traverse through the set of holes of the outer mesh and into the inner liner, the hollow nails including sharpened edges at distal ends of the hollow nails, the sharpened edges are configured to penetrate the inner liner.

14. The carrier assembly of claim 11, wherein the carrier box includes a lip, the lip being configured to prevent one or more protrusions from entering between a housing and the lid of the carrier box.

15. The carrier assembly of claim 11, wherein the inner liner is formed by one or more of Ethylene-vinyl acetate, Polyvinyl chloride, or polythene.

16. The carrier assembly of claim 11, wherein the inner liner has a thickness of 0.1 mm.

17. The carrier assembly of claim 11, wherein the set of holes of the outer mesh are bounded by boundaries, the boundaries being configured to protect the inner liner.

18. The carrier assembly of claim 11, wherein the seal is one or more of a zipper, fasteners, a hook and loop fastener, or magnets.

19. The carrier assembly of claim 11, wherein the carrier box includes one or more sensors, the sensors being configured to identify unauthorized access to the carrier box.

20. The carrier assembly of claim 11, wherein the injection mechanism comprises one or more of a pneumatic system, one or more processors, or an actuator.

21. A carrier assembly comprising:

a carrier bag having an outer mesh including a seal, the seal including one or more of a zipper, fasteners, a hook and loop fastener, or magnets, wherein the outer mesh is configured to have a set of holes along an outer surface area of the outer mesh, wherein the set of holes are bounded by boundaries, the boundaries being configured to protect an inner liner, the carrier bag having the inner liner configured to be waterproof and is within an interior surface area of the outer mesh, the inner liner is configured to be penetrated by hollow nails of an injection mechanism of a carrier box, wherein the inner liner is formed one or more of Ethylene-vinyl acetate, Polyvinyl chloride, or polythene; and the carrier box configured to have a compartment, the compartment is configured to contain the carrier bag, the carrier box including an array of hollow nails of the injection mechanism, wherein the hollow nails are configured to traverse through the set of holes of the outer mesh and into the inner liner, the hollow nails are positioned in an array along a bottom of the compartment and a lid of the carrier box, the hollow nails are configured to penetrate the inner liner of the carrier bag, wherein the hollow nails include an internal channel operatively coupled to an ink reservoir, the internal channel is configured to pass ink through the internal channel and into the inner liner, wherein the injection mechanism comprises one or more of of a pneumatic system, one or more processors, or an actuator.

* * * * *